Jan. 8, 1935.  E. TURNQUIST  1,987,164

METHOD OF PREPARING SHEET METAL TO BE WELDED

Original Filed Jan. 6, 1930   2 Sheets-Sheet 1

Inventor
Edward Turnquist
By Spencer Hardman & Fehr
his Attorneys

Jan. 8, 1935.  E. TURNQUIST  1,987,164
METHOD OF PREPARING SHEET METAL TO BE WELDED
Original Filed Jan. 6, 1930  2 Sheets-Sheet 2
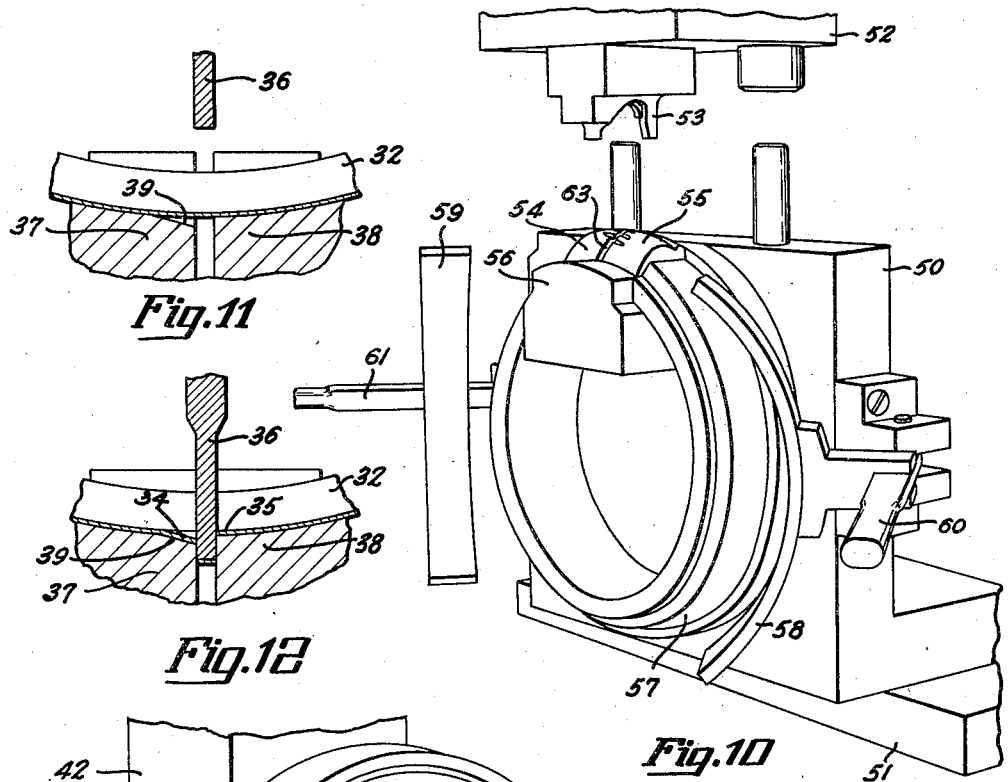
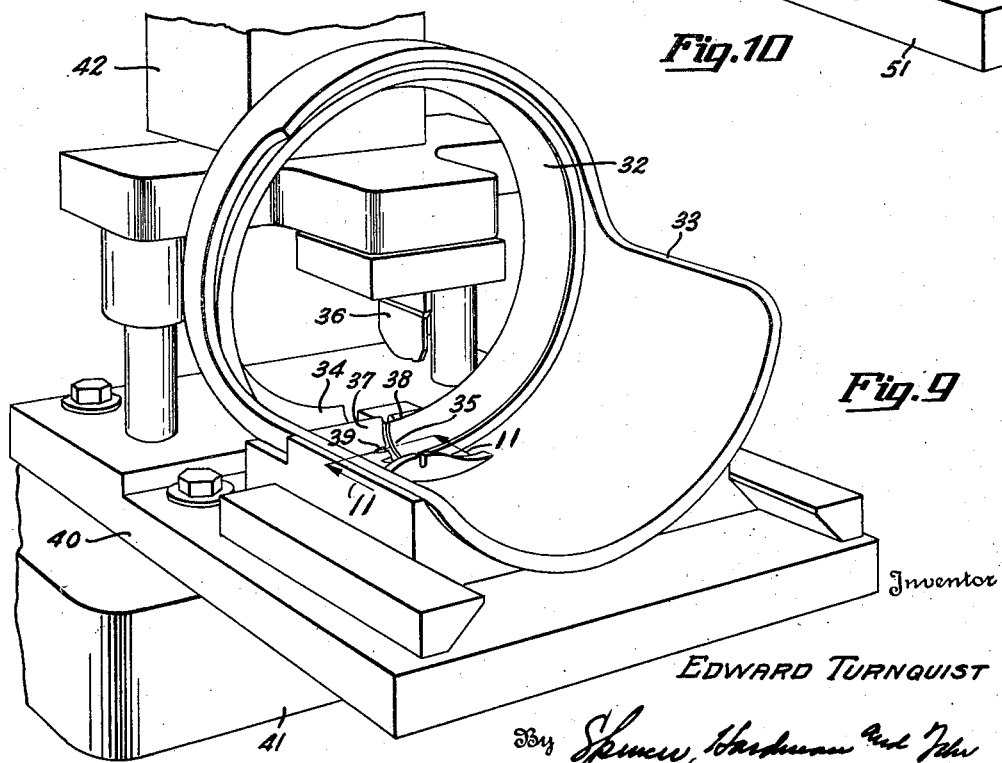
Inventor
EDWARD TURNQUIST Patented Jan. 8, 1935

1,987,164

UNITED STATES PATENT OFFICE 1,987,164

METHOD OF PREPARING SHEET METAL TO BE WELDED

Edward Turnquist, Anderson, Ind., assignor, by mesne assignments, to General Motors Corporation, Detroit, Mich., a corporation of Delaware Original application January 6, 1930, Serial No. 418,912, now Patent No. 1,924,220. Divided and this application August 21, 1931, Serial No. 558,469

5 Claims. (Cl. 113—116)

This invention relates to the manufacture of rims for the doors of electric lamps for vehicles and particularly for automobile head lamps.

It is an object of the present invention to provide a novel method for manufacturing lamp door rims by which a durable rim may be produced at lower cost than heretofore. This aim of the present invention is accomplished by rolling a flat strip of sheet material into a helical form, each turn of which has a cross-sectional contour suitable for the lamp door rim. In each turn of the helix there is sufficient material for forming one rim, allowing for trimming the abutting edges after cutting the helix into parts of one turn each. The next step is to cut the helix of formed material into parts of one turn each and to trim the end edges so that when the ends of each turn are abutted together there will be the exact amount of material for a lamp door rim. Finally, while the abutting edges are maintained in engagement under pressure, a welding current is applied in order to cause the abutting edges to be welded together.

This application is a division of my copending application Serial No. 418,912 filed January 6, 1930, now Patent No. 1,924,220.

Further objects and advantages of the present invention will be apparent from the following description, reference being had to the accompanying drawings, wherein a preferred embodiment of one form of the present invention is clearly shown.

In the drawings:

Fig. 9 is a fragmentary perspective view showing the apparatus for cutting the helix of material into parts of one turn each.

Fig. 10 is a fragmentary perspective view of apparatus for trimming the end edges of each turn of rim material in order to shape the surfaces to be joined as shown in Fig. 4.

Fig. 11 is an enlarged fragmentary sectional view taken on the line 11—11 of Fig. 9.

Fig. 12 is a view similar to Fig. 11 disclosing however, a completed cutting operation.

Figure 1:
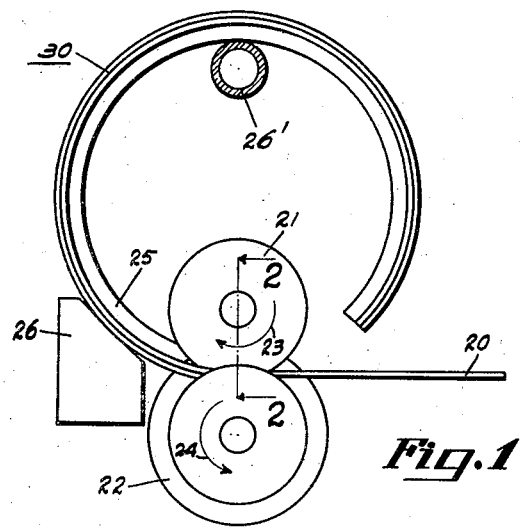
Fig. 1 is a diagrammatic view of the apparatus for forming a strip of sheet metal into a helix, each turn of which has the desired cross-sectional contour.
Figure 2:
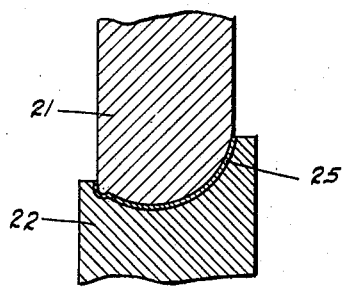
Fig. 2 is a fragmentary view on line 2—2 of Fig. 1 and is drawn to a larger scale.

The first step in the manufacture of lamp door rims according to the present invention consists of passing a strip 20 of sheet metal between forming rolls 21 and 22 which are driven by any suitable power means, not shown, in the direction of arrows 23 and 24 respectively in Fig. 1. The strip 20 is thus given the intermediate cross-sectional shape as shown at 25 in Fig. 2 which permits readily the shearing of the helix into single turns without changing the intermediate cross-sectional contour. As the sheet strip 25 passes toward the left from the rolls 21 and 22, it is engaged by a block 26 so shaped and located as to cause the material to be bent into a ring, the circumference of which is sufficient to provide the necessary material for one lamp door rim, allowing for trimming. Thus the forming apparatus shown in Fig. 1 forms the strip 20 into a helix 30 of lamp door rim material, each turn of which provides material for one lamp door rim. As the helix 30 is formed, it may be supported by a horizontal tubular rod 26', the rod being supported at its ends by any means (not shown). After all of the material of the strip 20 has been formed into a helix, the rod 26' may be removed from its supports in order to remove the helix 30 from the rod.

Figure 3:
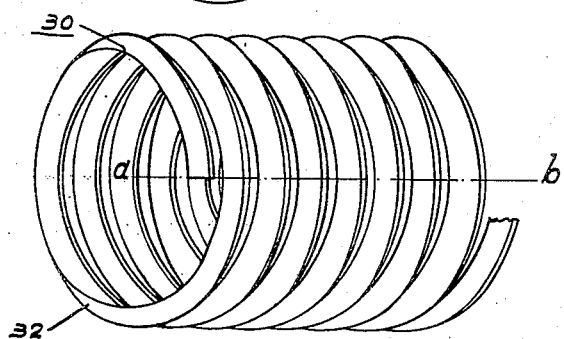
Fig. 3 is a fragmentary perspective view of a helix of lamp door material.

The next step is to divide the helix into lengths of one turn each by cutting the helix along a line parallel to its axis, such line being represented by line a—b in Fig. 3. The dividing of the helix 30 into lengths 32 of one turn each is effected by apparatus such as shown in Fig. 9. For the sake of clearness, only the end turn 32 of the helix is shown in position. It will be noted that the turn 32 is located within a cylindrical work-holder 33 adapted to receive and support one end of the helix, while the other end which extends away from the apparatus may be supported by any suitable means (not shown). Numeral 34 indicates one end of the turn 32, and numeral 35 indicates the other end which has been sheared from the remaining portion of the helix (which is omitted for the sake of clearness) by a shear-punch 36, both side edges of which are cutting edges as the punch cooperates with a pair of parallel shearing dies 37 and 38 to cut out a slug of rim material having a width corresponding to the distance between the dies 37 and 38. Both die members 37 and 38 are provided with notches 39 located in staggered relation in order that the material adjacent the end edges of the turn of material cut off will be formed roughly into the shape shown in Fig. 4. The work-holder 33 is supported by a base block 40 secured to the bed 41 of a punch press having a vertically reciprocating head 42 which supports the punch 36.

Figure 4:
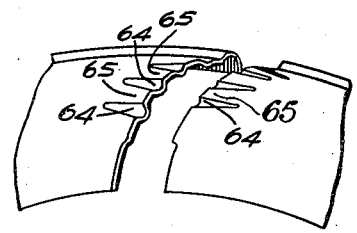
Fig. 4 is a fragmentary perspective view showing how the abutting ends of each turn of the helix are cut and shaped prior to joining together by butt-welding.

The abutting edge portions to be joined are trimmed and shaped into the form shown in Fig. 4 by the apparatus shown in Fig. 10. This trimming apparatus comprises a work-holder bracket 50 attached to the bed 51 of a punch press which has a vertically reciprocating head 52, carrying a forming die and shearing member 53 which cooperate with a pair of companion die and shearing members 54 and 55 supported by block 56 carried by the bracket 50. Bracket 50 carries a cylindrical rim support 57 against which a turn of lamp rim material may be held by the arcuate clamping members 58 and 59 which are attached respectively to levers 60 and 61 pivotally supported by the bracket 50. The apparatus being in the position shown in Fig. 10, the operator places a turn 32 of rim material upon the support 57 with the ends of the material resting upon the members 54 and 55 and overlying the space 63 between these members. Then the clamps 58 and 59 are moved against the turn 32 in order to clamp it firmly against the support 57 and to cause the desired amount of material to be trimmed off at the time the end portions are formed, as shown in Fig. 4. It will be noted that the member 53 cooperates with members 54 and 55 to trim off both end edges of the turn 32 to the shape shown in Fig. 4 and also to shape the material so that each end portion is provided with a series of notches or corrugations 64 located in staggered relation with the corrugations 64 of the opposite end portion. Calling the portions between the notches or valleys 64, ridges 65, it will be noted that each valley 64 of one edge portion is immediately opposite a ridge portion 65 of the other edge portion. The depth of the valleys 64 at the end edges is slightly more than the thickness of the material and decreases in depth proceeding from the end edge.

Figure 5:
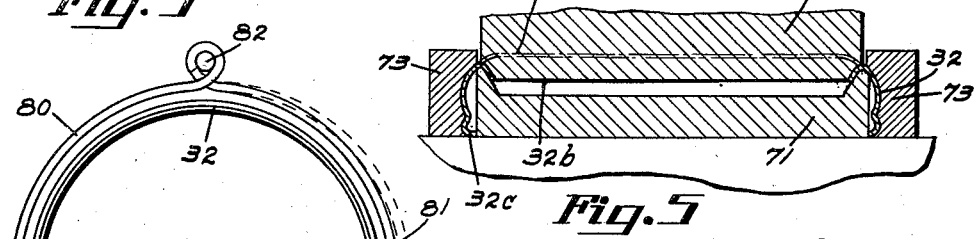
Fig. 5 is a fragmentary sectional view of dies for changing the cross-section or contour of a turn of lamp door rim material.

In order to shape the turn from intermediate cross-sectional contour into required cross-sectional contour, after the trimming operation performed by the apparatus shown in Fig. 10, the apparatus shown in Fig. 5 is employed which comprises a punch 70 cooperating with a die 71 in order to shape the peripheral flange portion 32a of the turn 32 which tapers away from the other peripheral edge or bead 32c into the flange portion 32b which tapers toward the bead 32c. During this forming operation the rim material 32 is clamped against the die 71 by a plurality of clamping members 73 which may be radially movable with respect to the die 71.

Figure 6:
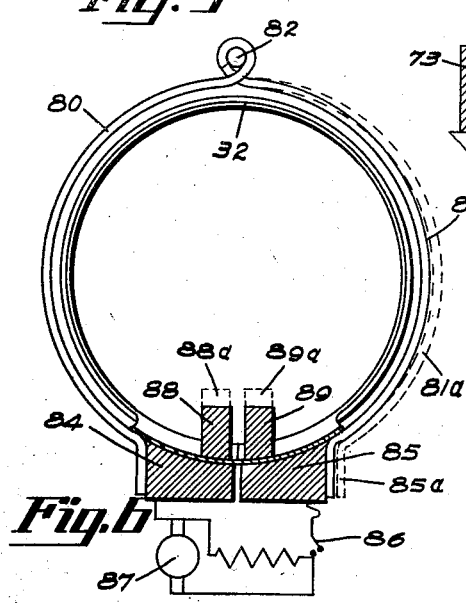
Fig. 6 is a diagrammatic view of electrical butt-welding apparatus, the electrodes and electrode clamps being shown in cross-section.

The ends of the turn 32 of rim material are united by an electric welding operation performed by the apparatus shown diagrammatically in Fig. 6. The welding apparatus comprises a contractible work-holder frame or ring comprising arcuate clamping members 80 and 81, hinged at 82. The free ends of the clamps 80 and 81 are attached to welding electrodes 84 and 85 respectively which, by closing a switch 86, are connected with a current source represented by a dynamo 87. The parts 88 and 89 represent diagrammatically the clamps which clamp the ends of the turn 32 firmly against the electrodes 84 and 85 respectively. One of the clamps and electrodes, for example, clamp 80 and electrode 84, may be stationary. The normal position of clamp 81 and its electrode 85 is indicated diagrammatically by the dot-and-dash line positions 81a and 85a, normally the electrode clamps 88 and 89 are in the position indicated by dot-and-dash lines 88a and 89a respectively in Fig. 6. When the welding apparatus is in normal position with the work clamps expanded and the electrode clamps raised, the turn 32 is located within the work-holder clamp. Then the electrode 85 is moved toward the electrode 84 into the full line position shown in Fig. 6 in order to cause the abutting edges of the work to be maintained in engagement with each other with substantial pressure. Then the electrode clamps 88 and 89 are lowered into the full line positions shown in Fig. 6 in order that there may be good electrical contact between the electrodes 84 and 85 and the end portions of the turn 32. Then the welding current is turned on by closing the switch 86 for a time sufficient to cause the materials to break down and fuse together.

Figure 7:
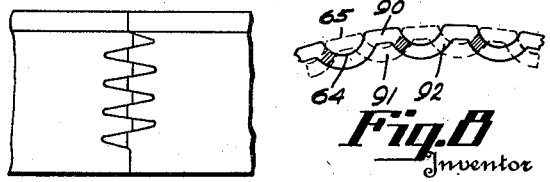
Fig. 7 is a view on a larger scale showing a welded joint after welding together the abutting end edges shown in Fig. 4.
Figure 8:
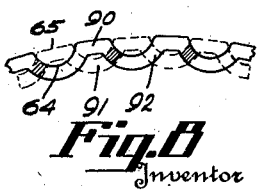
Fig. 8 is a diagrammatic view showing one of the abutting end surfaces superposed upon the other, one of the abutting end surfaces being outlined by unbroken lines and the other being outlined by dotted lines. In this view the shaded areas indicate the portions of the abutting surfaces which are actually in contact with each other before welding.

Particularly, when attempting to electrically butt-weld thin sheet metal, for example, sheet brass, it has been found necessary to fuse as much of the material together as possible in order to obtain a strong joint. Hence, it has been found desirable to provide the end portions with a series of corrugations which will be located in staggered relation with each other when the ends of the material are abutted together. This staggered relation is shown diagrammatically in Fig. 8. One of the end edge surfaces is shown by unbroken lines and is designated by numeral 90 and the other end edge surface abutting therewith is represented by broken lines and is designated by numeral 91. It is clearly seen that the valleys 64 of one edge are directly opposite the ridges 65 of the other and that the only abutting surfaces are those represented by the shaded portions 92. Since the abutting edges are at first in contact only at the surfaces 92, the welding operation is greatly facilitated since these spots offer relatively higher resistance to the passage of welding current and become readily heated, and on softening permit the corrugations of one piece to dovetail with the corrugations of another piece as shown in Fig. 7. In other words, while the welding current is applied pressure is applied against the electrode 85 to cause it to move toward the electrode 84 so that the corrugations of one end portion will be forced into the corrugations of the other end portion while the metal is plastic. It requires but a brief period for this fusion and interlocking to take place. It has been found that there is a fusion of material where the corrugations cross each other and also where the ridges of one end portion overlap the valleys of the other. Thus a joint is provided in which there are butt-welded portions alternating with lap-welded portions. The butt-welded portions are provided by the mashing together of the softened material adjacent those abutting edge surfaces indicated by the shaded areas 92. The lap-welded portions are provided between the overlapping ridges and valleys of the corrugations which are caused to be wedged together while soft due to the fact that the valleys decrease in depth proceeding from the end edge thereby causing the end edge of its mating ridge to bottom on a valley as one portion is forced into the other.

While the method of joining sheet-metal portions edge to edge is illustrated in connection with the manufacture of lamp door rims, it is within the scope of the present invention to apply it to the joining of other sheet-metal parts.

While the form of embodiment of the present invention as herein disclosed constitutes a preferred form, it is to be understood that other forms might be adopted, all coming within the scope of the claims which follow.

What is claimed is as follows:

1. The method of preparing a ring of sheet metal of a required cross-sectional contour to be closed by welding which consists in forming a strip of sheet metal into a helical coil of intermediate cross-sectional contour; in shearing the helix into parts of one turn each and corrugating the end portions of each turn so that the valleys and ridges of the corrugations in one portion are directly opposite the ridges and valleys respectively, of the corrugations in the other end portion; in deepening the valleys of both end portions of a turn and trimming the end edge portions of the turn so that they lie in one plane; and in shaping one of the turns so as to obtain a split ring of the required cross-sectional contour.

2. The method of preparing a ring of sheet metal of a required cross-sectional contour to be closed by welding which consists in forming a strip of sheet metal into a helical coil of intermediate cross-sectional contour, the contour being such that a shearing operation performed to divide the helix into individual turns does not change the contour; in shearing the helix into parts of one turn each and corrugating the end portions of each turn so that the valleys and ridges of the corrugations in one portion are directly opposite the ridges and valleys respectively of the corrugations of the other end portion; in deepening the valleys of both end portions of a turn and trimming the end edge portions of the turn so that they lie in one plane; and in shaping one of the turns so as to obtain a split ring of the required cross sectional contour.

3. The method of preparing a ring of sheet metal of a required cross-sectional contour to be closed by welding which consists in forming a strip of sheet metal into a helical coil of convex outer surface, each turn of which will provide material for a required ring; in shearing the helix into parts of one turn each and corrugating the end portions of each turn so that the valleys and ridges of the corrugations in one end portion are directly opposite the ridges and valleys respectively, of the corrugations in the other end portion; in deepening the valleys of both end portions of a turn and trimming the end edge portions of the turn so that they lie in one plane; and in shaping one of the turns into the required cross-sectional contour by inwardly turning part of the convex outer surface of a turn.

4. The method of preparing a ring of sheet metal of a required cross-sectional contour to be closed by welding which consists in forming a strip of sheet metal into a helical coil of intermediate cross-sectional contour, the contour being such that a shearing operation performed to divide the helix into individual turns does not change said contour; in shearing the helix into parts of one turn each and corrugating the end portions of each turn so that the valleys and ridges of the corrugations in one end portion are directly opposite the ridges and valleys respectively, of the corrugations in the other end portion; and in shaping each turn so as to obtain a split ring of the required cross-sectional contour.

5. The method of preparing a ring of sheet metal of a required cross-sectional contour to be closed by welding which consists in forming a strip of sheet metal into a helical coil of intermediate cross-sectional contour, the contour being such that a shearing operation performed to divide the helix into individual turns does not change said contour; in shearing the helix into parts of one turn each and corrugating the end portions of each turn so that the valleys and ridges of the corrugations in one end portion are directly opposite the ridges and valleys respectively, of the corrugations in the other end portion; in deepening the valleys of the corrugations of both end portions of a turn; and in shaping the turn so as to obtain a split ring of the required cross-sectional contour.

EDWARD TURNQUIST.